Patented Feb. 12, 1952

2,585,067

UNITED STATES PATENT OFFICE 2,585,067

PRODUCTION OF 1-ACETOXY-3-BUTEN-2-ONE

Joseph M. Wilkinson, Jr., Easton, Pa., assignor to General Aniline & Film Corporation, New York, N. Y., a corporation of Delaware No Drawing. Application October 10, 1950, Serial No. 189,488

4 Claims. (Cl. 260—488)

This invention relates to a method for preparing 1-acetoxy-3-buten-2-one comprising heating a mixture of 1,4-dihydroxy-2-butanone with an excess of acetic anhydride in an inert solvent.

1-acetoxy-3-buten-2-one has heretofore been obtained by syntheses involving the use of mercuric catalysts, i. e., it has been obtained by treatment of 1,4-diacetoxy-2-butyne in aqueous acetic acid with mercuric acetate (Lozach, Bull. soc. chim., 11, 514–515 (1944)) and by treatment of 4-acetoxy-2-butyn-1-ol with acid mercuric ion in non-aqueous solution (my copending application Serial No. 786,161, now Patent No. 2,524,025).

The thus obtained product, 1-acetoxy-3-buten-2-one, is of interest in the fields of polymers, either for the production of homopolymers or in reactions with other monomers. In addition, its chemical reactivity in such as to make it an important intermediate in the synthesis of a wide variety of chemical compounds having utility in the field of pharmaceuticals, dyestuffs and surface active agents. However, when 1-acetoxy-3-buten-2-one was prepared according to previous methods, employing mercuric salts as catalysts, the product was contaminated with metallic mercury which was difficult to remove by distillation. The presence of mercury in the product has a deleterious effect in many chemical reactions. In addition, in prior art procedures, particularly by the method of Lozach Bull. soc. chim., 11, 514–515 (1944), there is also obtained in addition to 1-acetoxy-3-buten-2-one, the anticipated 1,4-diacetoxy-2-butanone.

It has now been observed that 1-acetoxy-3-buten-2-one may be obtained from 1,4-dihydroxy-2-butanone by treatment with acetic anhydride in acetic acid. Surprisingly, by such a procedure, no significant quantity of the anticipated 1,4-diacetoxy-2-butanone is obtained.

I have found that by merely heating 1,4-dihydroxy-2-butanone, preferably in an inert solvent, with excess acetic anhydride, dehydration and acetylation occur and 1-acetoxy-3-buten-2-one is obtained in good yield. The process is operative over a relatively wide temperature range and temperatures within the range of 75 to 130° C. have been found to be operative. However, critical limits of temperature have not been established.

I have found that glacial acetic acid may advantageously be used as inert solvent for the reaction. However, if desired, other inert solvents such as dioxane, pyridine, carboxylic acid esters, etc., or excess acetic anhydride alone may be used. The amount of solvent is not extremely critical and as a general rule from 0.5 to 2 volumes of solvent are used for each volume of acetic anhydride employed in the reaction.

In order to obtain a satisfactory yield, it is desirable to employ an excess of acetic anhydride in the reaction and as a general rule at least two molecular proportions of acetic anhydride are used for each molecular proportion of 1,4-dihydroxy-2-butanone. However, the process is operative when equal molecular proportions are employed and, in fact, some of the product is formed when less than the theoretical amount of acetic anhydride is used.

The details of the present invention will be apparent from a consideration of the following specific example:

Example

To a solution of 136 g. 1,4-dihydroxy-2-butanone in 400 ml. glacial acetic acid is added 500 ml. acetic anhydride. The resulting solution is heated at 125–130° for 3–4 hours. The acetic acid and excess acetic anhydride are removed under diminished pressure. Distillation of the residue gives 1-acetoxy-3-buten-2-one, B. P.$_{7-8}$ 74–75° in yield of 60–65% of the theoretical amount. The residue largely consists of resinous condensation product.

The reaction may be characterized by the following equation—

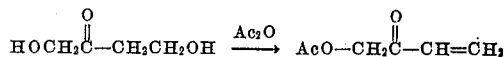

Since 1-acetoxy-3-buten-2-one is a readily polymerizable substance, the yield of the desired monomer can be improved by incorporating in the reaction mixture, either before or during the reaction (at least prior to isolation of the 1-acetoxy-3-buten-2-one), a small amount of a polymerization inhibitor of a type normally employed for the inhibition of "vinyl type" monomers. As examples of suitable inhibitors of this type may be mentioned hydroquinone, p-tert.-butyl catechol, sulfur, metallic copper, etc. Such inhibitors are effective when employed in minor amount, usually within the range of 0.5 to 2 percent of the 1-acetoxy-3-butene-2-one.

I claim:

1. A method of preparing 1-acetoxy-3-buten-2-one which comprises heating 1,4-dihydroxy-2-butanone with excess acetic anhydride in an inert solvent.

2. The method as defined in claim 1 wherein the solvent employed is glacial acetic acid.

3. The method as defined in claim 1 wherein there is present in the reaction mixture a minor amount of polymerization inhibitor.

4. The method as defined in claim 3 wherein the inert solvent is glacial acetic acid.

JOSEPH M. WILKINSON, Jr.

No references cited.